Figure 1:
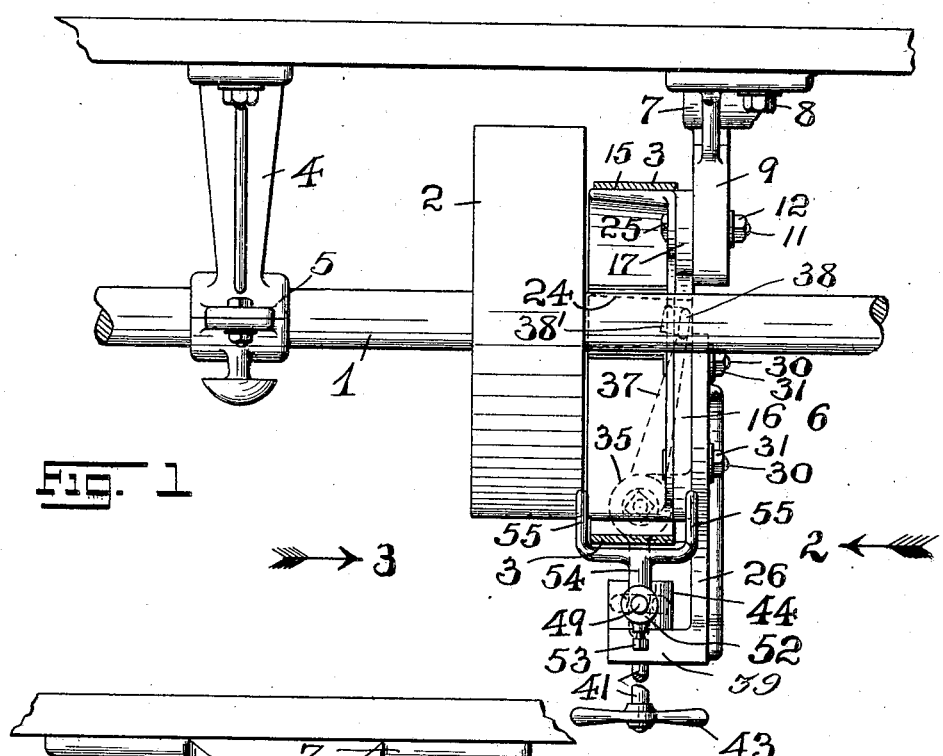

No. 886,730. PATENTED MAY 5, 1908.
I. A. ROMMER.
BELT SHIFTING MECHANISM.
APPLICATION FILED MAY 29, 1907.

4 SHEETS—SHEET 1.

WITNESSES:

INVENTOR:
Isaac A. Rommer,
BY Fraentzel and Richards,
ATTORNEYS

No. 886,730. PATENTED MAY 5, 1908.
I. A. ROMMER.
BELT SHIFTING MECHANISM.
APPLICATION FILED MAY 29, 1907.
4 SHEETS—SHEET 2.
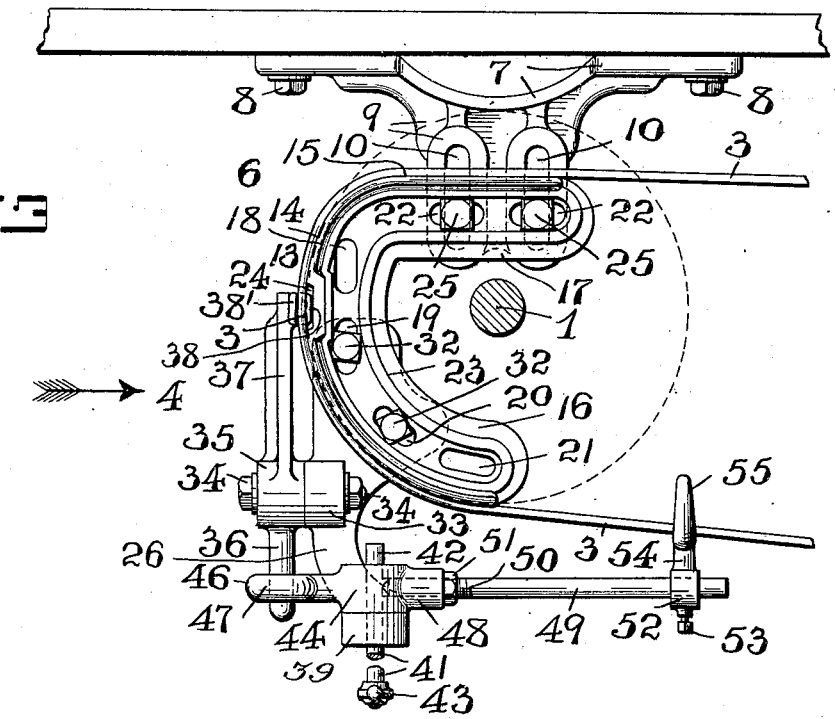
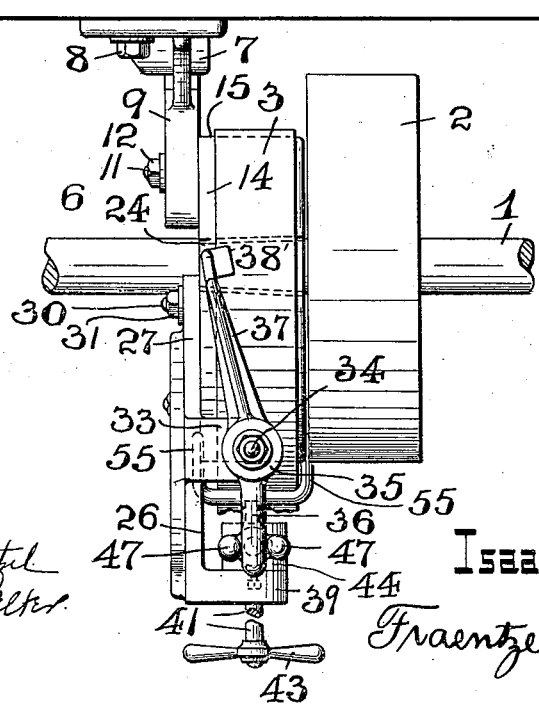
WITNESSES:
F. W. Fraentzel
Anna H. Alter
INVENTOR:
Isaac A. Rommer,
BY
Fraentzel and Richards,
ATTORNEYS

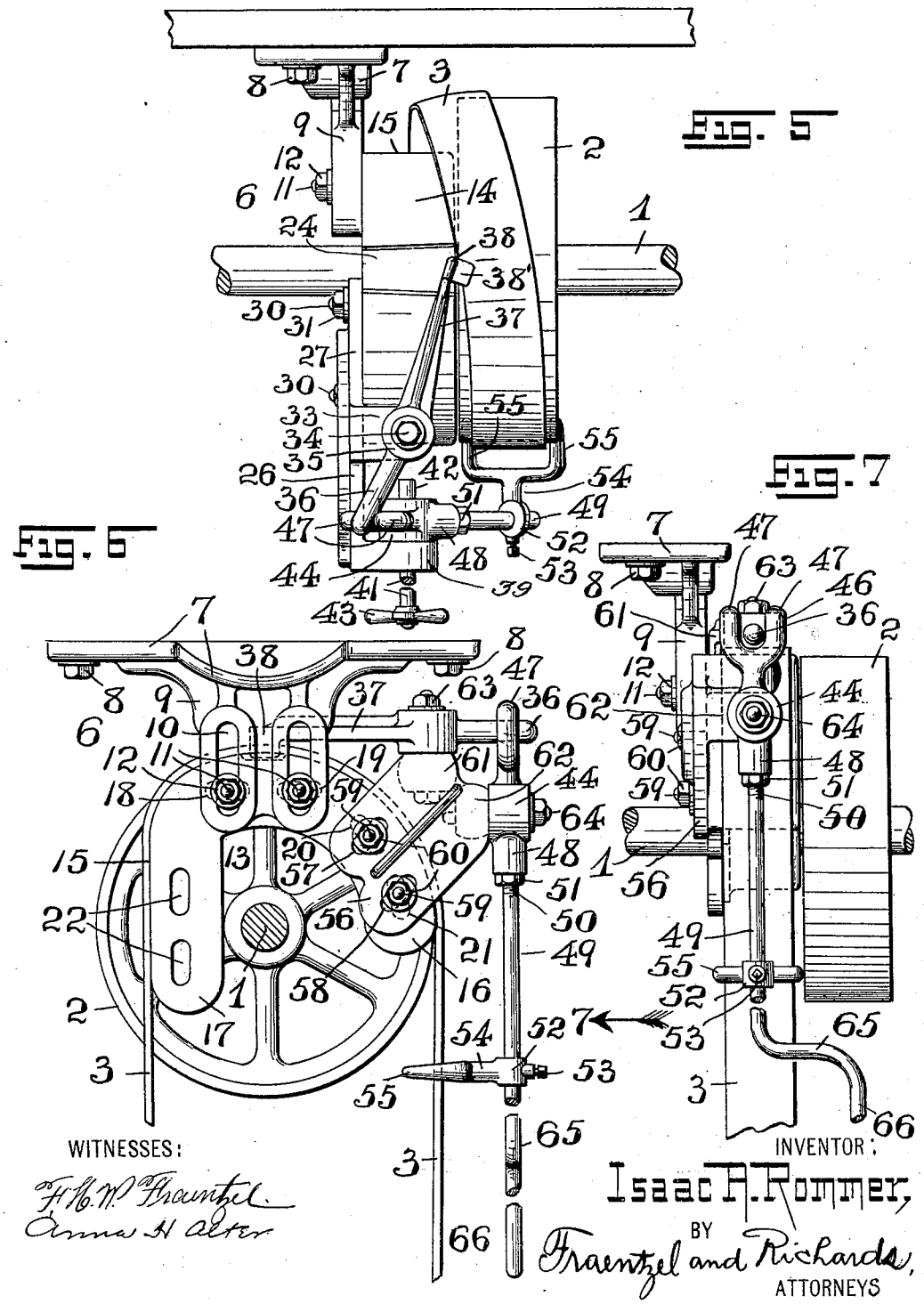

No. 886,730. PATENTED MAY 5, 1908.
I. A. ROMMER.
BELT SHIFTING MECHANISM.
APPLICATION FILED MAY 29, 1907.

4 SHEETS—SHEET 4.

WITNESSES:

INVENTOR:
Isaac A. Rommer,
BY
Fraentzel and Richards,
ATTORNEYS

UNITED STATES PATENT OFFICE.

ISAAC A. ROMMER, OF NEWARK, NEW JERSEY, ASSIGNOR OF ONE-HALF TO VICTOR MELLBERG, OF NEWARK, NEW JERSEY.

BELT-SHIFTING MECHANISM.

No. 886,730.           Specification of Letters Patent.           Patented May 5, 1908.

Application filed May 29, 1907. Serial No. 376,248.

*To all whom it may concern:*

Be it known that I, ISAAC A. ROMMER, citizen of the United States, residing at Newark, in the county of Essex and State of New Jersey, have invented certain new and useful Improvements in Belt-Shifting Mechanism; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference to improvements in that class of devices known in the art as belt-shifters; and, the present invention relates, more particularly, to a novel mechanism for shifting a belt from a revolving pulley onto a stationary support, and from such stationary support upon the moving pulley, so that the belt when removed from the pulley is at rest with all strain or tension relieved from the belt.

My present invention has for its principal object to provide a simple and adjustable mechanism for use as a belt-shifter, all with a view of providing a means which will engage the belt simultaneously at different points, substantially as will hereinafter more fully appear, which positively serves to shift the belt upon the cylindrical surface of the moving pulley.

A further object of this invention is to provide in connection with a belt-shifting mechanism, a suitable support having a reduced or a flat surface upon which a portion of the shifted belt will rest, so that all tension is entirely removed from the belt, which will hang slack.

Other objects of this invention not at this time more particularly enumerated will be clearly understood from the following detailed description of the invention.

The invention consists, therefore, in the novel belt-shifter hereinafter set forth; and, furthermore, this invention consists in the various arrangements and combinations of devices and parts, as well as in the details of the construction of the same, all of which will be hereinafter more fully described, and then finally embodied in the clauses of the claims which are appended to and which form an essential part of this specification.

Figure 2:
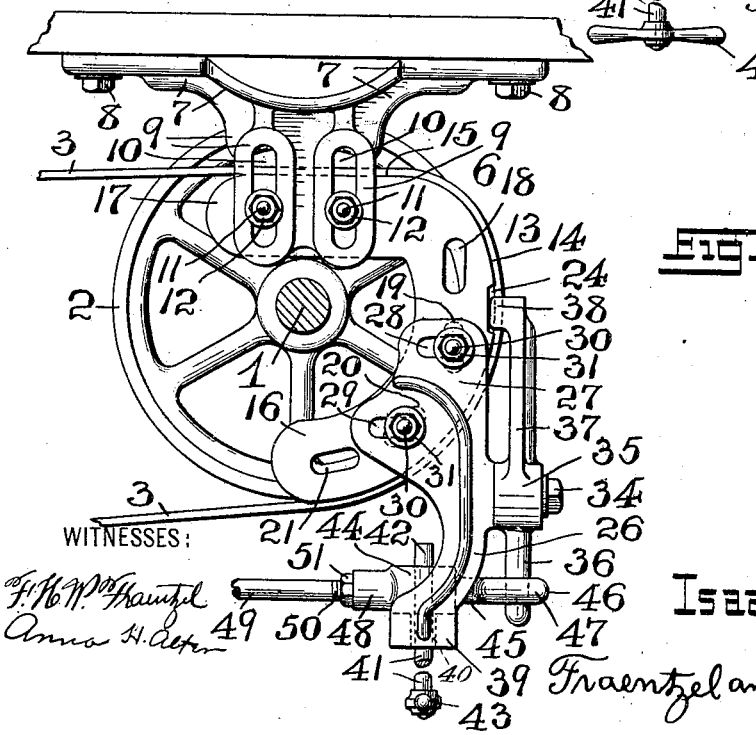
Figure 8:
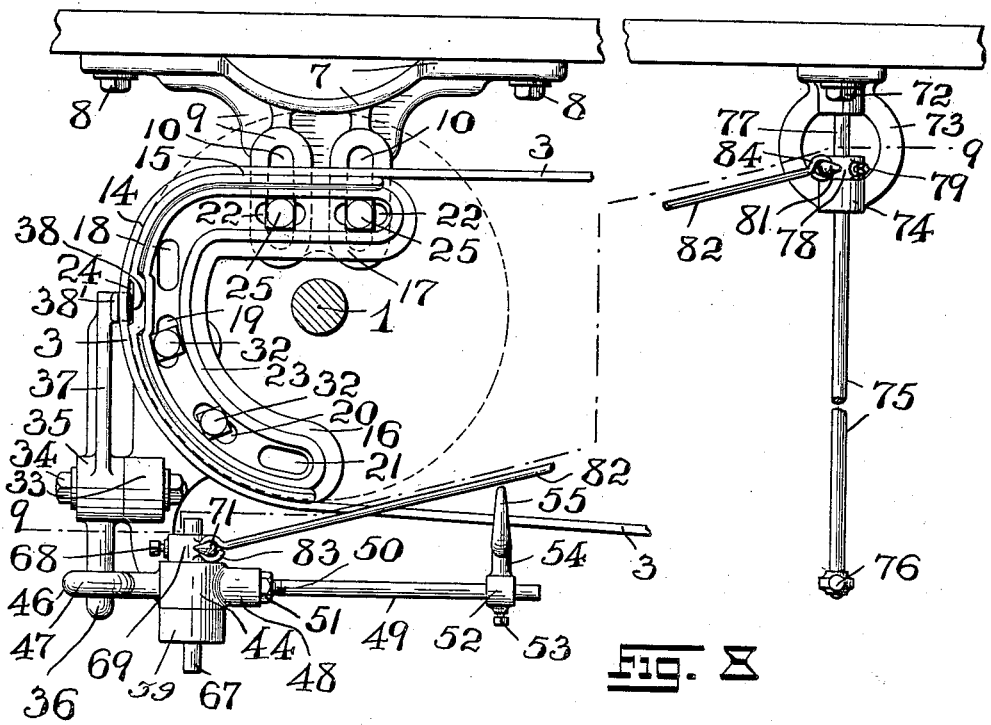
Figure 9:
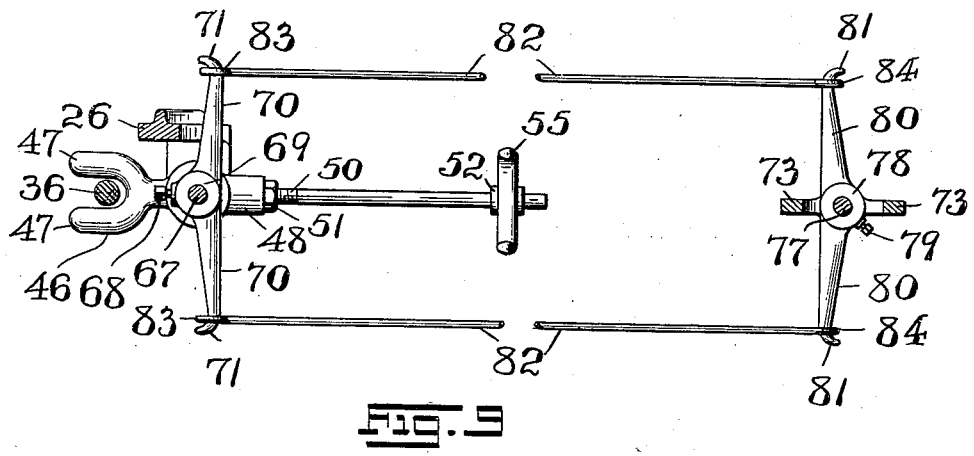

The invention is clearly illustrated in the accompanying drawings, in which:

Figure 1 is a face view of a portion of shafting and a pulley mounted thereon, with the novel belt-shifter and its hanger also shown in face or front elevation, the belt, however, being represented in cross-section, at rest, upon the support of the shifting device. Fig. 2 is a side view of the various devices and parts, looking in the direction of the arrow 2 in said Fig. 1. Fig. 3 is a similar view of the belt-shifting mechanism, looking in the direction of the arrow 3 in said Fig. 1; and Fig. 4 is a view, looking in the direction of the arrow 4 in Fig. 3. Fig. 5 is a similar view of the devices and parts represented in said Fig. 4, but illustrating the shifting element of the device engaging in contacting engagement with the belt at two different points, the belt being shown in its relative position while being shifted upon the revolving pulley. Fig. 6 is a side view of the belt-shifter, illustrating its use with a vertically running belt; and Fig. 7 is a face view of the same, looking in the direction of the arrow 7 in Fig. 6. Fig. 8 is a side view of the belt-shifter embodying the principles of this invention, provided with means for operating the shifting mechanism from a distance. Fig. 9 is a horizontal sectional representation, taken on line 9—9 in said Fig. 8.

Similar characters of reference are employed in all of the above described views, to indicate corresponding parts.

Referring now to the several figures of the drawings, the reference-character 1 indicates any suitable shaft upon which is mounted a fast pulley 2, and upon which is arranged a belt 3 to which motion is transmitted from said pulley. The shaft 1 revolves in the bearings 5 of the usual hangers 4, one of which is shown in Fig. 1 of the drawings, and the reference-character 6 indicates the belt-shifting device or mechanism which embodies the principles of this invention. This device or mechanism comprises a suitable hanger or bracket 7 which is suitably secured upon the ceiling or other fixture by means of bolts or lag-screws, as at 8, and is formed with a downwardly extending member or element 9 which is provided with one or more preferably elongated holes or openings 10. Suitably and preferably adjustably secured to this member or element 9, by means of the bolt or bolts 11 and the nut or nuts 12 is a belt-supporting fixture 13 comprising a segment or arc-shaped surface-portion 14 and a reduced or a flat surface-portion 15, the latter being arranged substantially at an angle to the said segment, substantially in the manner illustrated in Figs. 2, 3, and 6 of the drawings. It will be understood, however, that this angular arrangement of these parts may be departed from, if desired. Extending downwardly from one of the marginal edges of the segment 14 and the reduced or flat surface portion 15 are the flanges 16 and 17, respectively, said flange 16 being made with suitably disposed and preferably elongated holes or openings 18, 19, 20 and 21, and the flange 17 being provided with one or more preferably elongated holes or openings 22, all arranged substantially in the manner illustrated in the several figures of the drawings. In this manner, the said belt-supporting fixture 13 at any portions, transversely, is substantially of a ⌐-shaped or right-angled cross-section. If desired, these flanges 16 and 17 may be provided upon their inner faces with strengthening ribs 23, substantially as illustrated in Figs. 3 and 8 of the drawings, and extending laterally across the face of the segment or arc-shaped surface-portion 14 is a suitable depression 24, arranged substantially at the point shown. As has been stated, the device or mechanism 6 is secured against the side of the member or element 9 by means of the bolts 11, said bolts having their heads 25 arranged against the inner face of the flange 17 and the shanks of the bolts extending directly through the registering holes or openings 22 of the flange and the holes or openings 10 of the element 9, the parts then being positively secured in their assembled relation by firmly tightening the nuts 12 upon the screw-portions of said bolts.

A bracket or plate-like element 26, which is preferably formed with an end-portion, as 27, and is provided with the preferably elongated holes or openings 28 and 29, registering with the respective holes or openings 19 and 20 in the flange 16, substantially in the manner illustrated in the several figures of the drawings, is secured to said flange 16 by means of bolts 30 and nuts 31, the heads 32 of said bolts being arranged against the inner face of the flange 16 and the shanks of the bolts extending directly through the registering holes or openings 19 and 28, and 20 and 29, the parts being positively secured in their assembled relations by firmly tightening the nuts 31 upon the screw-portions of said bolts. Extending from the outer edge of said bracket or element 26 is a laterally extending member 33 which is provided with a bearing in which is arranged a pivot or bolt 34, upon which is adapted to oscillate a hub 35, said hub being provided with a downwardly extending finger or lug 36, and an upwardly extending arm 37, said arm being provided at the side and at its upper end with a suitable flange 38 in alinement with and movably arranged in the depression 24, when the belt is shifted, and said flange 38 being adapted to be brought in engagement with one of the edges of the belt, as will be clearly evident from an inspection of Figs. 1 to 8 inclusive. Said flange may be provided with a rub 38¹ overlapping a portion of the face of the belt, to prevent the slipping of the belt, during the shifting operation when there is a heavy load upon the belt. The bracket or element 26 is also made with a forwardly extending portion 39 which is provided with a tubular duct or opening 40, see dotted outline in Fig. 2. Extending into and through said opening 40 is the upper end-portion 42 of an actuating rod 41, said portion having a free movement in said opening 40, and at its opposite and lower end-portion being provided with a suitable handle or operating member 43. Suitably secured upon that portion of said rod which projects above the portion 39 is a tubular hub 44, said hub thus being movably arranged upon said portion 39, and being adapted to be oscillated by means of the rod 41, when actuated by means of its handle or operating member 43. Extending in one direction from said hub 44 is a finger or arm 45 provided with a bifurcated end-portion 46, the members 47 of which are arranged upon the opposite sides of the finger or lug 36, as clearly illustrated. The hub 44 is also made with a laterally extending socket-like member 48 into which is screwed the screw-end 50 of a rod 49, said rod having its end-portion screwed directly against the end-portion 42 of the actuating rod 41, so as to operatively secure to the hub 44 upon the rod 41. A lock-nut 51 is screwed upon said stem or rod 49 and against the face of the member 48 to prevent displacement of the rod 49. Adjustably arranged upon said rod 49 is a sleeve 52, adapted to be secured in any one of its adjusted positions upon said stem or rod 49 by means of a set-screw 53, said sleeve having an upwardly extending portion 54 which is provided with a yoke 55, substantially as shown.

From the foregoing description, and from an inspection of said Figs. 1 to 5 inclusive, it will readily be seen, that a belt-shifting device or mechanism has been produced in which a double or two point contact is at all times made at different points of the belt, the yoke 55, when the hub 44 is turned by means of the rod or stem 41, forcing the lower portion of the belt in direct alinement with the revolving pulley, and simultaneous with such action, the previously mentioned lug or flange 38, being moved into the depression 24 of the segment or arc-shaped surface-portion 14 and being brought against the edge of the belt forces the belt upon the revolving pulley, whereupon the belt will be drawn over and upon the face of the pulley so that it will move with the same and perform the work for which it is intended. As long as the belt is to be moved, the parts of the shifting devices or mechanism are left in the positions indicated in Fig. 5 of the drawings, but when the belt is to be shifted, all that is necessary is by the proper turning of the actuating member 43 of the rod or stem 41 to slip the belt from the pulley, shown in said Fig. 5, upon the belt supporting element of the belt-shifting mechanism, as clearly shown in Figs. 1 to 4 inclusive. When the belt has been shifted, a portion of the belt will rest directly upon the reduced or flat surface-portion 15 of the device, whereby the belt, when not in use, will hang slack, and all tension upon the belt, as is found to be the case with the belt-shifters used in connection with a loose pulley, is entirely overcome. The advantage of this is obvious.

In said Figs. 1 to 5 inclusive, I have shown the use of my novel belt-shifter with a horizontally running belt. The shifting device or mechanism may, however, with but very slight changes be used also with a vertically running belt, as clearly illustrated in Figs. 6 and 7 of the drawings. With this arrangement of belt, to bring the parts into their proper positions, the belt-supporting fixture 13 is moved to the position shown in Fig. 6, the bolts 11 in this case being passed through the holes or openings 18 and 19 in the flange 16 and through the openings or holes 10 of the bracket-member or element 9, the devices being positively held in the positions shown by the nuts 12 of said bolts. In place, however, of the bracket 26 shown in said Figs. 1 to 5 inclusive, a bracket 56 is used, said bracket being provided with a pair of preferably elongated holes or openings 57 and 58, registering with the respective holes or openings 20 and 21 in the flange 16, bolts 59 being arranged in said registering holes and the parts being secured together by means of the nuts 60 upon the screw-portions of said bolts, as will be clearly evident. This bracket 56 extends in an upward angular direction, substantially in the manner shown, and upon the side of its upper end-portion the bracket is provided with a pair of laterally extending members 61 and 62, the member 61 being provided with a pivotal pin or bolt 63 upon which is adapted to oscillate the previously described hub 35 from which extend the finger 36 and the arm 37; and the member 62 being provided with a pivotal pin or bolt 64 upon which is arranged the previously described hub 44 formed with the bifurcated end-portion 46 and with which hub is connected in the manner stated, the actuating or operating rod 49, this rod, however, extending at its lower end-portion to one side of the belt, as at 65, see Fig. 7, and terminating in a suitable handle or actuating member 66. The members 47 of the end-portion 46 being in engagement with the lug or finger 36 in substantially the same manner, as has been described in connection with the construction shown in Figs. 1 to 5 inclusive, the operations of the parts for shifting the belt are the same as those previously stated, and no further description will therefore be necessary.

In Figs. 8 and 9 of the drawings, I have shown the several devices and parts comprising the belt-shifting device or mechanism represented in Figs. 1 to 5 inclusive, the long-actuating or operating-rod 41 being dispensed with, and in lieu thereof a mechanism being employed for operating the shifting device from a distance, as is sometimes necessary. In this construction, the hub 44 oscillates upon or with a short pin or stem 67 to which is secured by means of a set-screw 68, a tubular hub 69 formed with oppositely extending arms 70, each arm being provided with a hook-shaped end or other receiving portion 71. At the desired distance from the belt-shifting device or mechanism is secured to the ceiling or other suitable fixture, by means of lag-screws 72, or any other fastening means, a bracket 73 which is formed with a tubular hub 74, or the like. Rotatively arranged in said hub is an actuating or operating rod or stem 75, provided at one end with a handle or actuating member 76. The opposite end-portion 77 of said rod or stem 75 projects above said hub 74, and secured thereto by means of a set-screw 79 is another hub 78 which rests upon the hub 74, substantially in the manner illustrated. Extending in opposite directions from said hub 78 are arms 80, each arm being provided with a hook-shaped end or other receiving portion 81. Links 82, provided at their respective ends with eyes or loops 83 and 84, are connected with the respective hook-shaped end-portions 71 and 81 of the respective arms 70 and 80. From an inspection of Fig. 9 it will be clearly seen, that any oscillatory or rotary movement of the rod or stem 75 will produce a corresponding movement of the hub 78 and its arms 80, which motion is imparted by means of the links 82 to the arms 70 and the hub 69, thus producing an oscillatory or rotary motion of the pin or stem 67, by means of which the belt-shifting device or mechanism is operated in the manner and for the purposes fully described in the foregoing specification.

I claim:

1. A belt-shifting mechanism comprising a fixed belt-supporting means, and a shifting means comprising a pair of oscillatorily arranged hubs, a rod for oscillating one of said hubs, said hub having a bifurcated portion extending therefrom, and the other hub being provided with a finger adapted to be engaged by said bifurcated portion, and means connected with said hubs for simultaneously engaging a belt at different points, all arranged to bring the belt in alinement with and shift it upon a moving pulley.

2. A belt-shifting mechanism comprising a fixed belt-supporting means, and a shifting means comprising a pair of oscillatorily arranged hubs, a rod for oscillating one of said hubs, said hub having a bifurcated portion extending therefrom, and the other hub being provided with a finger adapted to be engaged by said bifurcated portion, and means connected with said hubs for simultaneously engaging a belt at two different points, one at a point in front of the moving pulley and the other at a point back of the entrance of the belt upon the pulley, all arranged to bring the belt in alinement with and shift it upon the moving pulley.

3. A belt-shifting mechanism comprising a fixed belt-supporting means, and a shifting means comprising a pair of oscillatorily arranged hubs, a rod for oscillating one of said hubs, said hub having a bifurcated portion extending therefrom, and the other hub being provided with a finger adapted to be engaged by said bifurcated portion, a stem extending from one of said hubs, and an arm projecting from the other hub, and means on said stem and said arm for simultaneously engaging a belt at different points, all arranged to bring the belt in alinement with and shift it upon a moving pulley.

4. A belt-shifting mechanism comprising a fixed belt-supporting means, and a shifting means comprising a pair of oscillatorily arranged hubs, a rod for oscillating one of said hubs, said hub having a bifurcated portion extending therefrom, and the other hub being provided with a finger adapted to be engaged by said bifurcated portion, and means connected with said hubs for simultaneously engaging a belt, comprising a stem extending from one of said hubs, a yoke on said stem, said yoke being in engagement with the belt at one point, and an arm projecting from the other hub, having a flange thereon in engagement with another point of said belt, all arranged to bring the belt in alinement with and shift it upon a moving pulley.

5. A belt-shifting mechanism comprising a fixed hanger, and a belt-supporting fixture secured to said hanger, said fixture comprising a segmental portion and a reduced surface portion upon which the belt rests so as to hang slack, combined with a shifting means comprising a pair of oscillatorily arranged hubs, a rod for oscillating one of said hubs, said hub having a bifurcated portion extending therefrom, and the other hub being provided with a finger adapted to be engaged by said bifurcated portion, and means connected with said hubs for simultaneously engaging the belt at different points, all arranged to bring the belt in alinement with and shift it upon a moving pulley.

6. A belt-shifting mechanism comprising a fixed hanger, and a belt-supporting fixture secured to said hanger, said fixture comprising a segmental portion and a reduced surface portion upon which the belt rests so as to hang slack, combined with a shifting means comprising a pair of oscillatorily arranged hubs, a rod for oscillating one of said hubs, said hub having a bifurcated portion extending therefrom, and the other hub being provided with a finger adapted to be engaged by said bifurcated portion, a stem extending from one of said hubs, and an arm projecting from the other hub, and means on said stem and said arm for simultaneously engaging a belt at different points, all arranged to bring the belt in alinement with and shift it upon a moving pulley.

7. A belt-shifting mechanism comprising a fixed hanger, and a belt-supporting fixture secured to said hanger, said fixture comprising a segmental portion and a reduced surface portion upon which the belt rests so as to hang slack, combined with a shifting means comprising a pair of oscillatorily arranged hubs, a rod for oscillating one of said hubs, said hub having a bifurcated portion extending therefrom, and the other hub being provided with a finger adapted to be engaged by said bifurcated portion, and means connected with said hubs for simultaneously engaging the belt, comprising a stem extending from one of said hubs, a yoke on said stem, said yoke being in engagement with a belt at one point, and an arm projecting from the other hub, having a flange thereon in engagement with another point of said belt, all arranged to bring the belt in alinement with and shift it upon a moving pulley.

8. A belt-shifting mechanism comprising a fixed belt-supporting means formed with a laterally extending depression, and a belt-shifting arm having its free end-portion movably arranged in said depression.

9. A belt-shifting mechanism comprising a fixed belt-supporting means formed with a laterally extending depression, and a belt-shifting arm having a flange thereon movably arranged in said depression and in engagement with an edge of a belt, substantially as and for the purposes set forth.

10. A belt-shifting mechanism comprising a fixed belt-supporting means formed with a laterally extending depression, and a belt-shifting arm, having a flange thereon movably arranged in said depression and in engagement with an edge of a belt, and a rib extending from said flange, said rib projecting over a portion of the face of the belt, substantially as and for the purposes set forth.

11. In a belt-shifting mechanism, a fixed belt-support comprising a segmental portion formed with a reduced surface upon which the belt rests so as to hang slack, said segmental portion being provided in its face with a laterally extending depression, and a belt-shifting arm having its free end-portion movably arranged in said depression.

12. In a belt-shifting mechanism, a fixed belt-support comprising a segmental portion formed with a reduced surface upon which the belt rests so as to hang slack, said segmental portion being provided in its face with a laterally extending depression, and a belt-shifting arm, having a flange thereon movably arranged in said depression and in engagement with an edge of a belt, substantially as and for the purposes set forth.

13. In a belt-shifting mechanism, a fixed belt-support comprising a segmental portion formed with a reduced surface upon which the belt rests so as to hang slack, said segmental portion being provided in its face with a laterally extending depression, and a belt-shifting arm, having a flange thereon movably arranged in said depression and in engagement with an edge of a belt, and a rib extending from said flange, said rib projecting over a portion of the face of the belt, substantially as and for the purposes set forth.

In testimony, that I claim the invention set forth above I have hereunto set my hand this 25th day of May, 1907.

ISAAC A. ROMMER.

Witnesses:
    FREDK. C. FRAENTZEL,
    VICTOR MELLBERG.